United States Patent [19]

Kuze et al.

[11] Patent Number: 5,349,043
[45] Date of Patent: Sep. 20, 1994

[54] POLYCARBONATE AND PROCESS FOR PRODUCING THE SAME

[75] Inventors: Shigeki Kuze; Ryozo Okumura; Noriyuki Kunishi, all of Ichihara, Japan

[73] Assignee: Idemitsu Petrochemical Co., Ltd., Tokyo, Japan

[21] Appl. No.: 69,598

[22] Filed: Jun. 1, 1993

[30] Foreign Application Priority Data

Jun. 22, 1992 [JP] Japan .................................. 4-162748

[51] Int. Cl.$^5$ ............................................. C08G 64/00
[52] U.S. Cl. ..................................... 528/200; 528/196; 528/198; 526/62
[58] Field of Search ..................... 528/200, 198, 196; 526/62

[56] References Cited

U.S. PATENT DOCUMENTS 3,492,268  1/1970  Baker .................................. 528/171
4,383,092  5/1983  Ko et al. ............................. 528/200

FOREIGN PATENT DOCUMENTS 0512223  11/1992  European Pat. Off. ...... C08G 64/30

Primary Examiner—John Kight, III
Assistant Examiner—Richard Jones
Attorney, Agent, or Firm—Frishauf, Holtz, Goodman & Woodward

[57] ABSTRACT

A polycarbonate having desirable color tone or transparency, as well as desirable heat resistance and water resistance, in which the amounts of residual metals in the polycarbonate are 10 ppm or less in total of Fe, Cr and Mo and 50 ppm or less in total of Ni and Cr. The polycarbonate is obtained by transesterification of (A) a dihydroxy compound and (B) a carbonic diester in a reactor made of a metallic material containing at least one metal selected from the group consisting of Fe, Cr, Mo, Ni and Cu, and controlling the water content in the reactor to 500 ppm or less.

19 Claims, No Drawings

POLYCARBONATE AND PROCESS FOR PRODUCING THE SAME

BACKGROUND OF THE INVENTION

1. Field of the Invention

The present invention relates to a polycarbonate and a process for producing the same, particularly to a polycarbonate being excellent in color tone or transparency as well as heat resistance and water resistance, and a process for producing the same.

2. Description of the Related Arts

Generally, as processes for producing polycarbonate (hereinafter referred to as PC), a method of directly reacting an aromatic dihydroxy compound such as bisphenol A with phosgene (the Interfacial Method), and a method of transesterifying an aromatic dihydroxy compound such as bisphenol A and a carbonic ester such as diphenylcarbonate, in molten a state, (the Melting Method) are known.

However, the Interfacial Method has problems in (i) that toxic phosgene must be used, (ii) that the equipment for production is corroded with chlorine-containing compounds including hydrogen chloride and sodium chloride which are by-produced, and (iii) that impurities such as sodium hydroxide contaminating into the resin which adversely affect the physical properties of polymers is difficult to be separated away.

Though the Melting Method, on the other hand, has an advantage in being capable of producing a PC at a lower cost than in the Interfacial Method, it has a substantial disadvantage in not being free from coloring of the resin because the reaction usually continues for a long time at so high a temperature as 280° to 310° C.

In the Melting Method, various improvements have been proposed to reduce the coloring. For example, Japanese Patent Publication No. 39972/1986 and Japanese Patent Application Laid-Open No. 223036 disclose methods of using specified catalyst. Japanese Patent Application Laid-Open Nos. 151236/1986 and 158719/1987 and the like disclose methods of adding antioxidants at the latter stage of the reaction. Moreover, Japanese Patent Application Laid-Open No. 62522/1986 and the like disclose the use of twin-screw vented kneading extruder at the latter stage of the reaction, and Japanese Patent Application Laid-Open No. 153925/1990 and the like disclose the use of a horizontal stirring polymerization reactor, which are improvements in process. Further, Japanese Patent Application Laid-Open No. 175722/1990 discloses a method of controlling the hydrolizable chlorine content in the monomer to be under a prescribed level. Actually, however, the problem in coloring has not been overcome completely, and a satisfactory PC has not been obtained yet.

Furthermore, methods of limiting the material of reactor to a specific metal have been disclosed. Conventionally, when a reactor made of stainless steel is used, the resulting PC has been liable to be colored into yellow or yellowish brown. In order to improve that, U.S. Pat. No. 4,383,092 discloses a method of using tantalum, nickel or chromium as the material. Besides, Japanese Patent Application Laid-Open No. 7328/1992 discloses a method of buff-polishing stainless steel reactors, and Japanese Patent Laid-Open No. 7329/1992 discloses a method of acid washing stainless steel reactors.

However, these methods could not overcome the elusion of metals, and a satisfactory PC having an excellent color tone or transparency has not been obtained yet. It is indeed possible to prevent the elusion of metals by using a reactor in which all the reaction system is lined with glass. However, when the process is shutdown and the polymer is cooled to solidness, the glass breaks due to the difference in expansion coefficient. In this connection, this system is substantially not sufficient in mechanical strength, and cannot be employed for industrial use.

In view of the above circumstances, the present inventors have repeated intensive studies to develop a PC being excellent in color tone and transparency as well as heat resistance and water resistance, and a process for efficiently producing the PC.

As the result, it was found that the above object can be attained by controlling the amount of specific residual metals to be under a certain level, in the process for producing PC by transesterification. The present invention has been accomplished on the basis of this knowledge.

SUMMARY OF THE INVENTION

The present invention provides a PC which is obtained by transesterification of (A) a dihydroxy compound and (B) a carbonic diester in a reactor made of a metallic material comprising at least one metal selected from the group consisting of Fe, Cr, Mo, Ni, and Cu, the amount of residual metals in the resultant polycarbonate being (i) 10 ppm or less in total of Fe, Cr, and Mo, and (ii) 50 ppm or leas in total of Ni and Cu. The present invention also provides a process for producing a PC which comprises transesterification of (A) a dihydroxy compound and (B) a carbonic diester, said transesterification being conducted in a reaction system with water content of 500 ppm or less by the use of a reactor made of metallic material containing at least one metal selected from the group consisting of Fe, Cr, Mo, Ni and Cu.

DESCRIPTION OF PREFERRED EMBODIMENT

The PC of the present invention is produced by the use of a reactor made of a metallic material containing at least one metal selected from the group consisting of Fe, Cr, Mo, Ni and Cu, and by transesterification of a dihydroxy compound as Component (A) and a carbonic diester as Component (B). As the residual metals contained in the resultant polycarbonate, (i) the amount of Fe, Cr and Mo in total is 10 ppm or less, and (ii) the amount of Ni and Cu in total is 50 ppm or less.

The dihyroxy compounds to be used as component (A) in the present invention include various ones, for example, at least one selected from the group consisting of aromatic dihydroxy compounds, aliphatic dihydroxy compounds, bisesters of aromatic dihydroxy compounds, bisesters of aliphatic dihydroxy compounds, carbonates of aromatic dihydroxy compounds and carbonates of aliphatic dihydroxy compounds.

Aromatic dihydroxy compounds to be used as Component (A) include those represented by the general formula (I) :

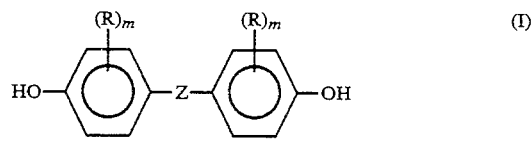

wherein R is a hydrogen atom, a halogen atom such as chlorine, bromine, fluorine, and iodine, or an alkyl group having 1 to 8 carbon atoms, and when R is plural, they may be identical to or different from each other, and m is a number of 0 to 4; Z is a single bond, an alkylene group having 1 to 8 carbon atoms, an alkylidene group having 2 to 8 carbon atoms, a cycloalkylene group having 5 to 15 carbon atoms, and a cycloalkylidene group having 5 to 15 carbon atoms, a bond such as —S—, —SO—, —SO$_2$—, —O—, —CO—, or a bond represented by the general formula (II):

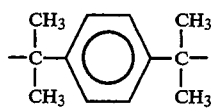
(II)

Specific examples of these compounds as mentioned above are bis(hydroxyaryl)alkanes such as bis(4-hydroxyphenyl)methane, 1,1-bis(4-hydroxyphenyl)ethane, 2,2-bis(4-hydroxyphenyl)propane (so called bisphenol A), 2,2-bis(4-hydroxyphenyl)butane, 2,2-bis(4-hydroxyphenyl)octane, 2,2-bis (4-hydroxyphenyl) phenylmethane, 2,2-bis(4-hydroxy-1-methylphenyl)propane, 1,1-bis(4-hydroxy-t-butylphenyl)propane, 2,2-bis (4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethyl-cyclohexane; dihydroxyarylethers such as 4,4-dihydroxydiphenylether, and 4,4'-dihydroxy-3,3'-dimethylphenylether; dihydroxydiarylsulfides such as 4,4'-dihydroxydiphenylsulfide, and 4,4'-dihydroxy-3,3'-dimethyldiphenylsulfide; dihydroxarylsulfoxides such as 4,4'-dihydroxy-3,3'-dimethyldiphenylsulfoxide; dihydroxydiarylsulfones such as 4,4'-dihydroxydiphenylsulfone, and 4,4'-dihydroxy-3,3'-dimethyldiphenylsulfone; dihydroxybenzene, and halogen-substituted or alkyl-substituted dihydroxybenzene such as 1,4-dihydroxy-2,5-dichlorobenzene and 1,4-dihydroxy-3-methylbenzene.

Aliphatic dihydroxy compounds as one of component (A) include various compounds. Specific examples of them are butane-1,4-diol, 2,2-dimethylpropane-1,3-diol, hexane-1,6-diol, diethyleneglycol, triethyleneglycol, tetraethyleneglycol, octaethyleneglycol, dipropyleneglycol, N,N-methyldiethanolamine, cyclohexane-1,3-diol, cyclohexane-1,4-diol, 1,4-dimethylolcyclohexane, p-xylyleneglycol, 2,2-bis-(4-hydroxycyclohexyl)-propane and ethoxide or propoxide of dihydric alcohol or phenol, such as bis-oxyethyl-bisphenol A, and bis-oxyethyl-tetrachlorobisphenol A and bis-oxyethyl-tetrachlorohydroquinone.

Examples of bisesters of aromatic dihydroxy compounds, and bisesters of aliphatic dihydroxy compounds to be used as Component (A) include the compounds represented by the general formula (III):

(III)

wherein R$^1$ indicates the residue resulted from removing two hydroxyl groups from the above-mentioned aliphatic dihydroxy compounds, and R$^2$ indicates an alkyl group having 1 to 6 carbon atoms or a cycloalkyl group having 4 to 7 carbon atoms, the compounds represented by the general formula (IV):

(IV)

wherein Ar$^1$ indicates the residue resulted from removing two hydroxyl groups from the above-mentioned aromatic dihydroxy compound, and R$^2$ is as defined before, the compounds represented by the general formula (V):

(V)

wherein Ar$^2$ indicates an aryl group, and R$^1$ is as defined before, and the compounds represented by the general formula (VI):

(VI)

wherein Ar$^1$ and Ar$^2$ are as defined before.

Examples of the carbonates of aromatic dihydroxy compounds or aliphatic dihydroxy compounds to be used as Component (A) are those represented by the general formula (VII):

(VII)

wherein R$^1$ and R$^2$ are as defined before, those represented by the general formula (VIII):

(VIII)

wherein R$^2$ and Ar$^1$ are as defined before, those represented by the general formula (IX):

(IX)

wherein R$^1$ and Ar$^2$ are as defined before, and those represented by the general formula (X):

(X)

wherein Ar$^1$ and Ar$^2$ are as defined before.

As the dihydroxy compound as Component (A) in the present invention, compounds as above are appropriately selected to be used, among which bisphenol A is preferably used. When bisphenol A is used, the adduct of phenol or the mixture of the adduct and phenol can also be used. By the use of these adducts, a high purity bisphenol A can be effectively obtained.

On the other hand, carbonic diesters to be used as Component (B) in the present invention include various ones, and for example, at least one compound selected from the group consisting of diaryl carbonates, dialkyl carbonates and alkylaryl carbonates.

The diaryl carbonates as Component (B) are the compounds represented by the general formula (XI):

(XI)

wherein $Ar^2$ is as defined above, and compounds represented by the general formula (X):

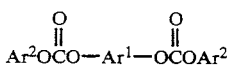
(X)

wherein $Ar^1$ and $Ar^2$ are as defined before.

The dialkyl carbonates therein are compounds represented by the general formula (XII):

(XII)

wherein $R^2$ is as defined above, and the compounds represented by the general formula (VIII):

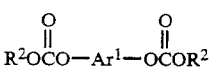
(VIII)

wherein $R^2$ and $Ar^1$ are as defined above.

Alkylaryl carbonates therein are those represented by the general formula (XIII):

(XIII)

wherein $R^2$ and $Ar^2$ are as defined before, and those represented by the general formula (XIV):

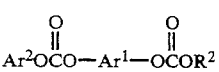
(XIV)

wherein $R^2$, $Ar^1$ and $Ar^2$ are as defined before.

Specific examples of these diaryl carbonates are diphenylcarbonate, ditolylcarbonate, bis(chlorophenyl)carbonate, m-cresylcarbonate, dinaphthylcarbonate, bis(diphenyl)carbonate, and bisphenol A-bisphenylcarbonate.

Specific examples of the dialkyl carbonates are diethylcarbonate, dimethylcarbonate, dibutylcarbonate, dicyclohexylcarbonate, and bisphenol A-bismethylcarbonate.

Specific examples of alkylaryl carbonates are methylphenylcarbonate, ethylphenylcarbonate, butylphenylcarbonate, cyclohexylphenylcarbonate, and bisphenol A-methylphenylcarbonate. Among them, diphenylcarbonate is particularly preferred.

As the carbonic diester as Component (B) in the present invention, above-mentioned compounds are appropriately selected to use. Among them, diphenylcarbonate is preferably used.

The polycarbonate of the present invention is obtained by transesterification of the above-mentioned Components (A) and (B) by the use of a reactor made of a metallic material containing at least one metal selected from the group consisting of Fe, Cr, Mo, Ni and Cu. As the residual metal contained in the resultant polycarbonate, the total amount of (i) Fe, Cr and Mo is 10 ppm or less, and (ii) Ni and Cu is 50 ppm or less, and thus the polycarbonate is excellent in color tone or transparency.

The polycarbonate of the present invention as described above is produced by various methods. For example, in producing polycarbonate by transesterification of before-mentioned Components (A) and (B), said transesterification is conducted by the use of a reactor made of a metallic material containing at least one metal selected from the group consisting of Fe, Cr, Mo, Ni and Cu, and the water content in said reactor is controlled to be 500 ppm or less, preferably 300 ppm or less, and still more preferably 100 ppm or less.

Theoretically, providing no water exists in the reaction system, the metal of the reactor hardly elutes out. Actually, however, it was found that a very small quantity of water is contained in monomers (Components (A) and (B)), causing the elusion of metals of the reactor. After various studies, it was found that the elution of metals can be substantially prevented by controlling the water content in the reaction system to above values or less.

In order to control the quantity of water in the reaction system to the before-mentioned value or less, various methods can be taken; a method of nitrogen-bubbling the monomer in molten state to reduce the water content in the monomer to 500 ppm or less, and thereafter feeding the monomer into the reactor; a method of passing the monomer in molten state through a dehydrating agent such as molecular sieve to reduce the water content to 500 ppm or less, and thereafter feeding the monomer into the reactor; and a method of dissolving the monomer into an azeotropic solvent of water (such as benzene), removing the solvent to reduce the water content in the monomer to 500 ppm or less, and thereafter feeding the monomer into the reactor.

By controlling the quantity of water in the reaction system to the before-mentioned value or less, the elusion of metal and coloring of the resultant PC can be prevented.

However, even if the quantity of water in the reaction system is controlled to the before-mentioned value or less, the effect is lowered or lost if a large amount of oxygen exists in the reaction system. Accordingly, in order to control the quantity of water to the before-mentioned value or less, and to exhibit the effect sufficiently, the amount of oxygen in the reactor should be 10 ppm or less, preferably 5 ppm or less.

Usually, the amount of oxygen in the reactor can be controlled to the above-mentioned value or less, by repeating the operation of depressurization-repressurization using an inert gas such as nitrogen. However, as the reaction proceeds, when the reaction system comes to be under reduced pressure, leaking of a little air is often caused. Accordingly, it is desirable to control the amount of oxygen in the reaction system by the use of an oxygen meter, blow the joint parts of the reactor with nitrogen or the like in the reaction, and take a leak check sufficiently before reaction.

In the process of the present invention, a transesterification of (A) a dihydroxy compound and (B) a carbonic diester is conducted while the quantity of water and the amount of oxygen in the reactor are controlled to the conditions as mentioned before, thereby the desired polycarbonate can be obtained.

Therein, the transesterification of Component (A) and Component (B) proceeds preferably under the conditions as follows.

Specifically, preferable conditions for producing polycarbonate therein are such that the value of the equation (i):

$$X = [OH] \times t \times \exp(-6.1 \times 10^3 / T) \quad \text{(i)}$$

[wherein [OH] is the concentration of the hydroxyl group (mol/g), t is reaction time (hr), and T is reaction temperature (K)] is $1 \times 10^{-7}$ or less, preferably $8 \times 10^{-8}$ or less, and more preferably $2 \times 10^8$ or less.

Under these conditions, the thermal deterioration of monomer and polymer can be further prevented.

Moreover, the polycarbonate is still more preferably produced under the following conditions.

That is, the value of the equation:

$$Y = S \times t \times \exp(-1.5 \times 10^4 / T) \quad \text{(ii)}$$

[wherein S is the contacting area (m$^{-1}$) of the metallic container per unit volume of the sample, and t and T are as defined above. ] is $1 \times 10^{-9}$ or less, preferably $1 \times 10^{-10}$, and more preferably $3 \times 10^{-11}$.

By addition of this condition, the elution of metals can be further inhibited.

In the present invention, though not particularly limited, terminal stoppers as shown below can be used. Specific examples of these terminal stoppers are o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, the compound represented by the formula:

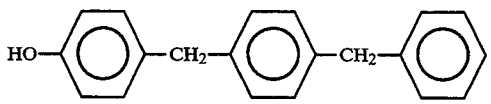

2,5-dicumylphenol or 3,5-dicumylphenol represented by the formula:

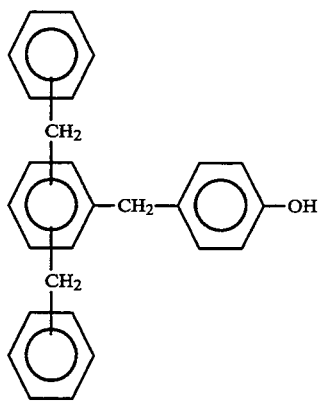

and chroman derivatives such as monohydric phenols represented by the formula:

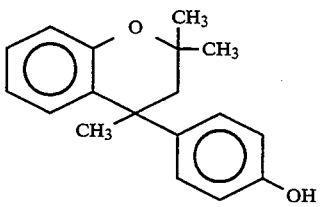

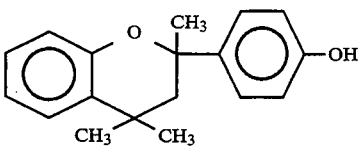

Among these phenols, though not particularly specified in the present invention, p-t-butylphenol, p-cumylphenol, and p-phenylphenol are preferable.

As other terminal stoppers, carbonic diester compounds are used as the case may be. Specific examples of the terminal stopper of carbonic diester compounds are carbobutoxyphenyl phenylcarbonate, methylphenylbutyl phenylcarbonate, ethylphenylbutyl phenylcarbonate, dibutyl diphenylcarbonate, biphenyl phenylcarbonate, dibiphenylcarbonate, cumylphenyl phenylcarbonate, dicumyl phenylcarbonate, naphthylphenyl phenylcarbonate, dinaphthyl phenylcarbonate, carbopropoxyphenyl phenylcarbonate, carboheptoxyphenyl phenylcarbonate, carbomethoxy t-butylphenyl phenylcarbonate, carbopropoxyphenylmethylphenyl phenylcarbonate, chromanyl phenylcarbonate and dichromanylcarbonate.

Further examples are compounds represented by the formula:

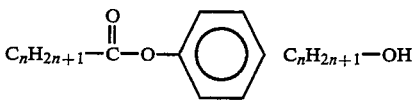

wherein n is an integer of 7 to 30

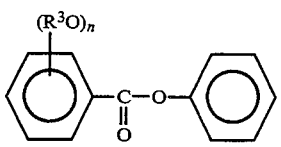

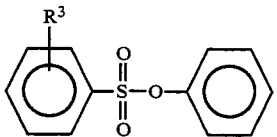

wherein R$^3$ indicates an alkyl group having 1 to 12 carbon atoms, and n is an integer of 1 to 3.

If the amount of terminal stopper of monohydric phenols or carbonic diester compounds as above is in the range of 0.05 mol % to 10 mol % based on 1 mol of dihydroxy compound as Component (A), terminals of the hydroxyl group of the resultant polycarbonate are sealed. Accordingly, a polycarbonate sufficiently excellent in heat resistance and water resistance can be obtained.

The whole amount of the above-mentioned monohydric phenols or carbonic diester compounds may be added to the reaction system in advance, or a part of them may be added in the reaction system in advance and the rest may be added as the reaction proceeds.

Further, in some cases, after the polycondensation of (A) dihydroxy compound and (B) carbonic diester partially proceeds, whole the amount of the terminal stopper can be added.

Further, in the present invention, though not particularly restricted, phloroglucine, trimellitic acid, 1,1,1-tris(4-hydroxyphenyl)ethane, 1-[α-methyl-α-(4'-hydroxyphenyl)ethyl]-4-[α',α'-bis(4''-hydroxyphenyl)ethyl]benzene, α,α', α''-tris(4-hydroxyphenyl)-1,3,5-triisopropylbenzene, isatinbis(o-crezol) and the like can be used as the branching agent.

In the present invention, catalysts are not particularly required, but conventional catalysts can be used to promote the transesterification. Specific examples of these catalysts are single substance, oxide, hydroxide, amide compound, alcholate, phenolate of alkali metal or alkaline earth metals; basic oxides of metals such as ZnO, PbO and $Sb_2O_3$; organic titanium compounds, soluble manganese compounds; acetates of Ca, Mg, Zn, Pb, Sn, Mn, Cd, and Co. Further, catalysts in combination of nitrogen-containing basic compound and boron compound; nitrogen-containing basic compound and alkali- (or alkaline earth) metal compound and boron compound are also used.

In the present invention, antioxidants can be used as needed. Specific examples of the antioxidants are phosphorus-based antioxidants such as tris(nonylphenyl)-phosphite, trisphenylphosphite, 2-ethylhexyldiphenyl-phosphite, trimethylphosphite, triethylphosphite, tricresylphosphite, and triarylphosphite.

In the process of the present invention, specifically, the reaction proceeds in accordance with conventional transesterification. The procedures and conditions of the process of the present invention are specifically shown as follows.

As Component (A), dihydroxy compounds such as aromatic dihydroxy compounds, aliphatic dihydroxy compounds, and bisesters of aromatic dihydroxy compounds, carbonates of aromatic dihydroxy compounds, bisesters of aliphatic dihydroxy compounds, and carbonates of aliphatic dihydroxy compounds as mentioned above are used. As Component (B), carbonic diesters such as diaryl carbonates, dialkyl carbonates and alkylaryl carbonates are used. Components (A) and (B) should be compounded in such a ratio that the amount of carbonic diester be 1 to 1.5 times (mol) that of dihydroxy compound. In some cases, the amount of carbonic diester is preferably 1.02 to 1.20 times (mol) that of dihydroxy compound, that is, a little excess of stoichiometric amount.

The reaction temperature in the process is not particularly specified, but usually is 100° to 330° C., preferably 180° C. to 300° C., more preferably it is gradually raised to 180° C. to 300° C. as the reaction proceeds. Said reaction proceeds slowly ruder 100° C., and at a temperature in excess of 330° C., thermal deterioration of polymer is undesirably caused.

The pressure at reaction is selected depending on the reaction temperature according to the vapor pressure of the monomer to be used. Said pressure is not particularly limited provided the reaction is efficiently conducted. Usually, at the initial stage of the reaction, the reaction proceeds at atmospheric pressure or under elevated pressure, that is, 1 to 50 atm (760 to 38,000 torr), and is reduced at the latter stage of the reaction, preferably to 0.01 to 100 torr finally. The reaction is continued until the desired molecular weight is obtained, and the reaction time is usually 0.2 to 10 hours.

The reaction as above is conducted in the absence of inert solvents, but if necessary, may be conducted in the presence of an inert solvent in an amount of 1 to 150% by weight based on the amount of PC to be obtained.

Inert solvents to be used therein are, for example, aromatic compounds such as diphenylether, halogenated diphenylether, benzophenone, polyphenylether, dichlorobenzene, and methylnaphthalene; chlorofluorohydrocarbon; alkanes such as ethane and propane: cycloalkanes such as cyclohexane, tricyclo (5,2,10)-decane, cyclooctane, and cyclodecane; alkenes such as ethene and propene and sulfur hexafluoride.

In the present invention, as the reaction proceeds, phenols or alcohols derived from the carbonic diesters used, or esters thereof, and inert solvents are also produced and removed out of the reactor. These products can be recycled after separated and purified, so equipments to take them up is preferably provided with.

The reaction in the present invention can be conducted batchwise or continuously, and in any equipment. When the production is conducted in continuous system, it is preferred to use at least two reactors, and to define the reaction conditions as above.

The structure of the reactor to be used in the present invention is not particularly limited, and is made of a material containing metals mentioned as above, and the reactor having usual a stirring function may be employed. However, since the viscosity increases at the latter stage of the reaction, the reactor having a stirring function of high viscosity type is preferred. Further, the reactor is not limited to a tank-type, but may also be an extruder-type.

The PC obtained in the above manner may be directly pelletized, or can be molded by the use of an extruder or the like.

With the PC obtained by the present invention, conventional additives such as plasticizers, pigments, lubricating agents, releasing agents, stabilizers, and an inorganic fillers can be blended.

Further, these PCs can be blended with polymers such as polyester, polysulfonate, polyamide, and polyphenyleneoxide.

As described above, according to the present invention, a polycarbonate excellent in color tone (transparency) can be obtained by transesterification of (A) dihydroxy compound and (B) carbonic diester, and said polycarbonate can be produced efficiently by the use of a reactor made of a metallic material containing at least one metal selected from the group consisting of Fe, Cr, Mo, Ni and Cu, and controlling the water content in the reactor system to a specified amount or less.

Consequently, the process of the present invention can be effectively and extensively used for producing a high quality polycarbonate and advantageously on an industrial scale.

Further, the present invention will be described in greater detail with reference examples, examples and comparative examples. However, the present invention is not restricted to the following examples.

REFERENCE EXAMPLE 1

(Preparation of Diphenylcarbonate A)

Into a 100-L (L=liter) tank-type stirring reactor (made of SUS 316), 51.4 kg (240 mol) of diphenylcarbonate having a water content of 480 ppm, and the air in the reactor was replaced with nitrogen by repeating depressurization-repressurization with nitrogen. Subsequently, the diphenylcarbonate was melted at 100° C., and subjected to nitrogen-bubbling for 2 hours while stirring at 200 rpm. The water content of the diphenylcarbonate was 60 ppm.

REFERENCE EXAMPLE 2

(Preparation of Diphenylcarbonate B)

Into a 100-L tank-type stirring reactor (made of SUS 316), 51.4 kg (240 mol) of disphenylcarbonate having a water content of 480 ppm, and the air in the reactor was replaced with nitrogen by repeating depressurization-repressurization with nitrogen. Subsequently, the diphenylcarbonate was melted at 100° C. and passed through a column packed with molecular sieve 4A under nitrogen pressure. The water content of diphenylcarbonate was 20 ppm.

REFERENCE EXAMPLE 3

(Preparation of Bisphenol A)

Into a 100-L tank-type stirring reactor (made of SUS 316), 45.6 kg (200 mol) of bisphenol A having a water content of 720 ppm, and the air in the reactor was replaced with nitrogen by repeating depressurization-repressurization with nitrogen. Subsequently, evacuation was conducted for 4 hours while stirring at 100 rpm at 120° C. The water content in bisphenol A was 150 ppm.

REFERENCE EXAMPLE 4

(Preparation of Adduct A of Bisphenol A and Phenol)

In a 100-L tank-type stirring reactor (made of SUS 316), the adduct of bisphenol A having a water content of 750 ppm and phenol (1:1.58 in molar ratio) was placed, and the air in the reactor was replaced with nitrogen by repeating depressurization-repressurization with nitrogen. Subsequently, said mixture was heated to 102° C. to be melted, passed through a column packed with molecular sieve 4A under nitrogen pressure, and the water content in the adduct was adjusted to 40 ppm.

REFERENCE EXAMPLE 5

(Preparation of Adduct B of Bisphenol A and Phenol)

In a 100-L tank-type stirring reactor (made of SUS 316), an adduct of bisphenol A and phenol (1:1.58 in molar ratio) having a water content of 750 ppm, and the air in the reactor was replaced with nitrogen by repeating depressurization-repressurization using nitrogen. Subsequently, the adduct was heated to 102° C. to be melted, subjected to nitrogen bubbling for 2 hours while stirring at 200 rpm, and the water content in the adduct was adjusted to 10 ppm.

EXAMPLE 1

After it was confirmed that the degree of vacuum in a 200-L autoclave lined with Ni reached to 0.5 mmHg by the use of a vacuum pump, the system was held to confirm that the degree of vacuum was not changed for one hour. Subsequently, the air in the system was replaced with nitrogen by repeating depressurization-repressurization with nitrogen ten times while the system was kept at 120° C. Then, 51.4 kg (240 mol) of diphenylcarbonate A prepared in Reference Example 1 was fed in molten state using nitrogen pressure. Subsequently, 45.6 kg (200 mol) of bisphenol A prepared in Reference Example 3 was fed in solid state using nitrogen pressure. The amount of oxygen in the system was 5 ppm.

The mixture was heated to 180° C., 5.0 g (0.02 mol) of $(C_4H_9)_4NBH_4$ as the catalyst was added thereto, and the reaction was started at 60 rpm while a trace amount of nitrogen was flown. Then, after phenol ceased to be distilled out, the degree of vacuum in the system was gradually decreased to 200 mmHg, and the reaction was continued until phenol was distilled away. Up to then, the reaction time was 2 hours, conversion was 85%, the average concentration of hydroxyl group in the system was $2.5 \times 10^{-3}$ mol/g.

Further, the temperature was raised to 200° C., and after phenol ceased to be distilled out, the degree of vacuum was gradually increased to 100 mmHg, and the reaction was continued until phenol was not distilled out more. Up to then, the reaction time was 1 hour, the conversion was 95%, and the average concentration of hydroxyl group in the system was $6.3 \times 10^{-4}$ mol/g.

Subsequently, the temperature was raised to 240° C., and after phenol ceased to be distilled out any more, the degree of vacuum was gradually increased to 15 mmHg, and the reaction was continued until phenol was not distilled out any more. Up to then, the reaction time was 1.5 hours, the conversion was 99%, and the average concentration of hydroxyl group in the system was $2.0 \times 10^{-4}$ mol/g.

After that, the temperature was raised to 280° C., and the degree of vacuum was gradually increased to 0.5 mmHg finally. Then, diphenylcarbonate as well as phenol was distilled away. Up to then, the reaction time was 1.5 hours, the conversion was 100%, and the average concentration of hydroxyl groups in the system was $3.4 \times 10^{-5}$ mol/g.

The viscous and transparent condensate obtained last was extruded into a strand state by the use of a gear pump made of copper, and pelletized by a pelletizer. The resultant pellet was press-molded, and the YI of the press sheet (3 mm in thickness) was determined. The result is shown in Table 1.

EXAMPLE 2

The procedure of Example 1 was repeated except that the diphenylcarbonate B prepared in Reference Example 2 was used. The result is shown in Table 1.

EXAMPLE 3

The procedure of Example 1 was repeated except that 75.3 kg of the Adduct A (containing 200 mol of bisphenol A) of bisphenol A and phenol, prepared in Reference Example 4, was used. The result is shown in Table 1.

EXAMPLE 4

The procedure of Example 1 was repeated except that 75.3 kg of Adduct B (containing 200 mol of bisphenol A) of bisphenol A and phenol, prepared in Reference Example 5, was used. The result is shown in Table 1.

EXAMPLE 5

The procedure of Example 1 was repeated except that the diphenylcarbonate B prepared in Reference Example 2 and Adduct B prepared in Reference Example 5 were used. The result is shown in Table 1.

EXAMPLE 6

The procedure of Example 1 was repeated except that the diphenylcarbonate was passed through a column packed with molecular sieve 4A at being fed. The result is shown in Table 1.

EXAMPLE 7

The procedure of Example 1 was repeated except that the material of autoclave was SUS 316 (70% by weight of Fe, 12% by weight of Ni, 16% by weight of Cr, and 2% by weight of Mo). The result is shown in Table 1.

EXAMPLE 8

A 200-L autoclave (Ni lining) was kept at 120° C., depressurization-repressurization with nitrogen was repeated ten times, thereby the air of the reaction system was replaced with nitrogen. 51.4 kg (240 mol) of diphenylcarbonate prepared in Reference Example 1 was fed in a molten state using nitrogen pressure. Subsequently, 45.6 kg (200 mol) of bisphenol A prepared in Reference Example 3 was fed in solid state using nitrogen pressure. The amount of oxygen in the system was 5 ppm.

The mixture was heated to 240° C., 5.0 g (0.02 mol) of $(C_4H_9)_4NBH_4$ as the catalyst was added, and the reaction was started at 60 rpm while a trace amount of nitrogen was flown. After 2 hours reaction, the degree of vacuum was gradually decreased to 200 mmHg, and reaction was continued for another one hour. The conversion was 90%, the concentration of hydroxyl group in the system was $2.4 \times 10^{-3}$ mol/g.

Subsequently, the reaction was continued for 1.5 hours while the degree of vacuum was gradually increased to 15 mmHg. The conversion was 99%, and the concentration of hydroxyl group in the system was $3.5 \times 10^{-3}$ mol/g.

Thereafter, the temperature was raised to 280° C., and the degree of vacuum was gradually increased to 0.5 mmHg finally. Then, diphenylcarbonate as well as phenol was distilled away. Up to that stage, the reaction time was 1.5 hours, the conversion was 100%, the concentration of hydroxyl group in the system was $3.4 \times 10^{-5}$ mol/g.

Lastly, the resultant viscous and transparent condensate was extruded into a strand state by the use of a copper gear pump, and pelletized by a pelletizer. The pellet was press-molded, and the YI of the press sheet (3 mm in thickness) was determined. The result is shown in Table 1.

EXAMPLE 9

The reaction of Example 6 was repeated except that the reaction stage at 280° C. was conducted for 30 minutes using a thin film evaporation reactor (surface area: 23 m², Ni lining).

The result is shown in Table 1.

COMPARATIVE EXAMPLE 1

In a 200-L autoclave (Ni lining), it was confirmed that a degree of vacuum of 0.5 mmHg was reached by the use of a vacuum pump. Thereafter, the system was held to confirm that the degree of vacuum was not changed for one hour. Subsequently, 51.4 kg (240 mol, water content: 210 ppm) of untreated diphenylcarbonate and 45.6 kg (240 mol, water content: 390 ppm) of untreated bisphenol A, in solid state, were thrown in. Further, depressurization-repressurization using nitrogen was repeated ten times to replace the air in the system with nitrogen. Then, the temperature was raised to 120° C. to melt the mixture. The oxygen content in the system was 5 ppm. The subsequent reaction was conducted in the same manner as in Example 1. The result is shown in Table 1.

COMPARATIVE EXAMPLE 2

The procedure of Comparative Example 1 was repeated except that the material of autoclave was SUS 316. The result is shown in Table 1.

COMPARATIVE EXAMPLE 3

The procedure of Comparative Example 1 was repeated except that the material of autoclave was Hastelloy B-2 (69% by weight of Ni, 28% by weight of Mo). The result is shown in Table 1.

COMPARATIVE EXAMPLE 4

The procedure of Comparative Example 1 was repeated except that the material of autoclave was copper lining. The result is shown in Table 1.

COMPARATIVE EXAMPLE 5

In a 200-L autoclave (Ni lining), it was confirmed that a degree of vacuum of 0.5 mmHg was reached by a vacuum pump. Thereafter the system was held. 1 hour after, the pressure in the system returned to ordinary pressure, but the procedure of Comparative Example 1 was repeated under the ordinary pressure. The result is shown in Table 1.

COMPARATIVE EXAMPLE 6

The same procedure of Comparative Example 3 was repeated except that the material of autoclave was SUS 316. The result is shown in Table 1.

COMPARATIVE EXAMPLE 7

In a 200-L autoclave (Ni lining), it was confirmed that a degree of vacuum of 0.5 mmHg was reached by a vacuum pump. Thereafter, the system was held, and it was confirmed that the degree of vacuum was not changed for one hour. Subsequently, 51.4 kg (240 mol, water content: 210 ppm) of untreated diphenylcarbonate and 45.6 kg (240 mol, water content: 390 ppm of untreated bisphenol A, in solid state, were thrown in. Further, depressurization-repressurization with nitrogen was repeated ten times to replace the air in the system with nitrogen. Then, the temperature was raised to 120° C. to melt the mixture. The oxygen content in the system was 5 ppm.

The mixture was heated to 240° C. and reacted for 4 hours at 80 rpm while a trace amount of nitrogen was flown. The conversion was 40%, and the concentration of hydroxyl group in the system was $3.5 \times 10^{-3}$ mol/g.

Then, the degree of vacuum was increased to 1 mmHg over one hour, and the reaction was conducted for 2 hours. The conversion was 80%, the concentration of hydroxyl group in the system was $2.1 \times 10^{-3}$ mol/g. Further, the temperature was raised to 280° C. and reaction was continued for 3 hours. The conversion was 90%, the concentration of hydroxyl group in the system was $9.2 \times 10^{-4}$ mol/g.

Lastly, the temperature was raised to 300° C., and the mixture was reacted for 1 hour in a thin film evaporation reactor (surface area: 23 m², Ni lining). The conversion was 100%, the concentration of hydroxyl group in the system was $3.2 \times 10^{-4}$ mol/g. The reaction thereafter was conducted in the same manner as in Example 1. The result is shown in Table 1.

TABLE 1

| No. | Water Content*1 (ppm) | Oxygen Content*2 (ppm) | X value × $10^{-8}$ | Y value × $10^{-11}$ |
|---|---|---|---|---|
| Example 1 | 102 | 5 | 1.2 | 2.8 |
| Example 2 | 81 | 5 | 1.1 | 2.8 |
| Example 3 | 48 | 3 | 1.3 | 2.8 |
| Example 4 | 30 | 4 | 1.2 | 2.8 |
| Example 5 | 14 | 3 | 1.0 | 2.8 |
| Example 6 | 74 | 3 | 1.0 | 2.8 |
| Example 7 | 102 | 5 | 1.1 | 2.8 |
| Example 8 | 102 | 3 | 5.3 | 3.4 |
| Example 9 | 74 | 3 | 1.1 | 86 |
| Comparative Example 1 | 590 | 5 | 1.3 | 2.8 |
| Comparative Example 2 | 590 | 5 | 1.4 | 2.8 |
| Comparative Example 3 | 590 | 5 | 1.3 | 2.8 |
| Compartive Example 4 | 590 | 5 | 1.4 | 2.8 |
| Comparative Example 5 | 590 | 50 | 1.4 | 2.8 |
| Comparative Example 6 | 590 | 50 | 1.4 | 2.8 |
| Comparative Example 7 | 590 | 5 | 17.8 | 230 |

| No. | Amount of Residual Metal (ppm)*3 | | | | | | | Mv | YI*4 |
|---|---|---|---|---|---|---|---|---|---|
| | Fe | Cr | Mo | Total | Ni | Cu | Total | | |
| Example 1 | — | — | — | — | 6 | 5 | 11 | 21,000 | 3.0 |
| Example 2 | — | — | — | — | 4 | 5 | 9 | 21,000 | 2.8 |
| Example 3 | — | — | — | — | 3 | 5 | 8 | 20,000 | 2.4 |
| Example 4 | — | — | — | — | 2 | 2 | 4 | 23,000 | 2.2 |
| Example 5 | — | — | — | — | 1 | 2 | 3 | 22,000 | 1.9 |
| Example 6 | — | — | — | — | 1 | 1 | 2 | 22,000 | 1.8 |
| Example 7 | 4 | 1 | 1 | 1 | 1 | 5 | 6 | 20,000 | 4.3 |
| Example 8 | — | — | — | — | 12 | 4 | 16 | 20,000 | 3.2 |
| Example 9 | — | — | — | — | 30 | 4 | 34 | 25,000 | 6.5 |
| Comparative Example 1 | — | — | — | — | 44 | 13 | 57 | 19,800 | 10.5 |
| Comparative Example 2 | 12 | 2 | 1 | 15 | 2 | 11 | 13 | 20,500 | 16.2 |
| Comparative Example 3 | — | — | 13 | 13 | 31 | 11 | 42 | 18,000 | 37.0 |
| Comparative Example 4 | — | — | — | — | — | 63 | 63 | 19,000 | 25.0 |
| Comparative Example 5 | — | — | — | — | 44 | 18 | 63 | 18,800 | 30.0 |
| Comparative Example 6 | 20 | 4 | 2 | 26 | 4 | 18 | 28 | 17,000 | 35.0 |
| Comparative Example 7 | — | — | — | — | 250 | 10 | 260 | 15,000 | 78.0 |

The notes in the tables are as follows.
*1Water content in the monomer initially placed in
*2Higher value of the oxygen content before the reaction and that when re-pressurized by a high-purity nitrogen gas after the reaction was completed (determined by PORTABLE TRACE OXYGEN ANALYZER, produced by TELEDYNE ANALYTICAL INSTRUMENTS CO.)
*3Determined according to the atomic absorption method, using an atomic absorption analyzer (Z-8100, manufactured by HITACHI)
*4Determined in accordance with JIS K7103-77, by Color Meter SM-3, manufactured by SUGA TESTER CO., LTD.

The notes in the tables are as follows.

*1: Water content in the monomer initially placed in
*2: Higher value of the oxygen content before the reaction and that when re-pressurized by a high-purity nitrogen gas after the reaction was completed (determined by PORTABLE TRACE OXYGEN ANALYZER, produced by TELEDYNE ANALYTICAL INSTRUMENTS CO.)
*3: Determined according to the atomic absorption method, using an atomic absorption analyzer (Z-8100, manufactured by HITACHI)
*4: Determined in accordance with JIS K7103-77, by Color Meter SM-3, manufactured by SUGA TESTER CO., LTD.

What is claimed is:

1. A polycarbonate which is obtained by transesterification of (A) a dihydroxy compound and (B) a carbonic diester in a reactor made of a metallic material comprising at least one metal selected from the group consisting of Fe, Cr, Mo, Ni, and Cu, the amount of residual metals in the resultant polycarbonate being (i) 10 ppm or less in total of Fe, Cr and Mo, and (ii) 50 ppm or leas in total of Ni and Cu.

2. A process for producing a polycarbonate with a residual metal content of (i) 10 ppm or less in total of Fe, Cr, and Mo, and (ii) 50 ppm or less in total of Ni and Cu which comprises transesterifying (A) a dihydroxy compound and (B) a carbonic diester with a water content of 500 ppm or less in a reactor made of metallic material containing at least one metal selected from the group consisting of Fe, Cr, Mo, Ni and Cu.

3. The process according to claim 2 wherein (A) the dihydroxy compound is at least one selected from the group consisting of aromatic dihydroxy compounds, aliphatic dihydroxy compounds, bisesters of aromatic dihydroxy compounds, bisesters of aliphatic dihydroxy compounds, carbonates of aromatic dihydroxy compounds and carbonates of aliphatic dihydroxy compounds.

4. The process according to claim 2 wherein (B) the carbonic diester is at least one compound selected from the group consisting of diaryl carbonates, dialkyl carbonates and alkylaryl carbonates.

5. The process according to claim 2 wherein a water content in the reactor is 300 ppm or less.

6. The process according to claim 2 wherein a water content in the reactor is 100 ppm or less.

7. The process according to claim 2 wherein an amount of oxygen in the reactor is 10 ppm or less.

8. The process according to claim 2 wherein an amount of oxygen in the reactor is 5 ppm or less.

9. The process according to claim 2 comprising transesterifying under the condition that the value of X in the equation (i) is $1 \times 10^{-7}$ or less:

$$X = [OH] \times t \times \exp(-6.1 \times 10^3/T) \quad \text{(i)}$$

wherein [OH] is the concentration of the hydroxyl group (mol/g), t is reaction time (hr), and T is reaction temperature (K).

10. The process according to claim 2 comprising transesterifying under the condition that the value of X in the equation (i) is $1 \times 10^{-7}$ or less and the value of Y in the equation (ii) is $1 \times 10^{-9}$ or less:

$$X = [OH] \times t \times \exp(-6.1 \times 10^3/T) \quad \text{(i)}$$

wherein [OH] is the concentration of the hydroxyl group (mol/g), t is reaction time (hr), and T is reaction temperature (K), $$Y = S \times t \times \exp(-1.5 \times 10^4/T) \qquad \text{(ii)}$$

wherein S is the contacting area ($m^{-1}$) of the metallic reactor per unit volume of a sample, and t and T are as defined above.

11. The process according to claim 3 wherein (B) the carbonic diester is at least one compound selected from the group consisting of diaryl carbonates, dialkyl carbonates and alkylaryl carbonates; a water content in the reactor is 300 ppm or less; and an amount of oxygen in the reactor is 10 ppm or less.

12. The process according to claim 11, wherein the water content in the reactor is 100 ppm or less and the amount of oxygen in the reactor is 5 ppm or less.

13. The process according to claim 12 comprising transesterifying under the conditions that X in the equation (i) is $1 \times 10^{-7}$ or less:

$$X = (OH)(t) \exp(-6.1 \times 10^3/T) \qquad \text{(i)}$$

wherein (OH) is the concentration of the hydroxyl group in mol/g, t is reaction time in hours, and T is reaction temperature in degrees K and Y in the equation (ii) is $1 \times 10^{-9}$ is less:

$$Y = (S)(t) \exp(-1.5 \times 10^{-4}/T) \qquad \text{(ii)}$$

wherein (S) is contacting area of the metallic reactor per unit volume of a sample.

14. The process according to claim 13 wherein the dihydroxy compound is selected from the group consisting of bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclopentane, 1,1-bis(4-hydroxyphenyl)cyclohexane, 1,1-bis(4-hydroxyphenyl)-3,5,5-trimethyl-cyclohexane, 4,4-dihydroxydiphenylether, 4,4'-dihydroxy-3,3'-dimethylphenylether, 4,4'-dihydroxydiphenylsulfide, 4,4'-dihydroxy-3,3'-dimethyldiphenylsulfide, 4,4'-dihydroxy-3,3'-dimethyldiphenylsulfoxide, 4,4'-dihydroxydiphenylsulfone, 4,4'-dihydroxy-3,3'-dimethyldiphenylsulfone, dihydroxybenzene, 1,4-dihydroxy-2,5-dichlorobenzene, 1,4-dihydroxy-3-methylbenzene, butane-1,4-diol, 2,2-dimethylpropane-1,3-diol, hexane-1,6-diol, diethyleneglycol, triethyleneglycol, tetraethyleneglycol, octaethyleneglycol, dipropyleneglycol, N,N-methyldiethanolamine, cyclohexane-1,3-diol, cyclohexane-1,4-diol, 1,4-dimethylolcyclohexane, p-xylyleneglycol, 2,2-bis-(4-hydroxycyclohexyl)-propane, bis-oxyethyl-bisphenol A, bis-oxyethyl-tetrachlorobisphenol and bis-oxyethyl-tetrachlorohydroquinone; and the carbonic diester is selected from the group consisting of diphenylcarbonate, ditolylcarbonate, bis(chorophenyl)carbonate, m-cresylcarbonate, dinaphthylcarbonate, bis(diphenyl)carbonate, bisphenol A-bisphenylcarbonate, diethylcarbonate, dimethylcarbonate, dibutylcarbonate, dicyclohexylcarbonate, bisphenol A-bismethylcarbonate, methylphenylcarbonate, ethylphenylcarbonate, butylphenylcarbonate, cyclohexylphenylcarbonate, and bisphenol A-methylphenylcarbonate.

15. The process according to claim 14 wherein the dihydroxy compound (A) and the carbonic diester (B) are in amounts such that the molar amount of the carbonic diester (B) is 1 to 1.5 times the amount of the dihydroxy compound (A).

16. The process according to claim 15 wherein the molar amount of the carbonic diester (B) is 1.02 to 1.20 times the amount of the dihydroxy compound (A).

17. The process according to claim 15 wherein the process is carried out at a temperature of 100° to 330° C., at a pressure of 1 to 50 atm and for a period of time of 0.2 to 10 hours.

18. The polycarbonate according to claim 1 wherein the amount of residual nickel is 1 to 34 ppm.

19. The polycarbonate according to claim 1 wherein the amount of the residual nickel is 1 to 16 pm.

* * * * *